United States Patent
Katsuki et al.

[11] Patent Number: 5,992,486
[45] Date of Patent: *Nov. 30, 1999

[54] LAMINATE GAS BARRIER LAYER FOR PNEUMATIC TIRES

[75] Inventors: Shogo Katsuki, Moriyama; Kazuto Yamakawa, Hiratsuka; Jiro Watanabe, Hiratsuka; Hiroyuki Kaido, Hiratsuka, all of Japan

[73] Assignees: Gunze Limited, Tokyo-to; The Yokohama Rubber Co., Ltd., Kyoto-fu, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/527,214

[22] Filed: Sep. 12, 1995

[30] Foreign Application Priority Data

Sep. 13, 1994 [JP] Japan .................................. 6-218732
Jul. 7, 1995 [JP] Japan .................................. 7-171799
Jul. 7, 1995 [JP] Japan .................................. 7-172023

[51] Int. Cl.$^6$ .............................. B60C 5/02; B32B 25/04
[52] U.S. Cl. .................................. 152/510; 152/DIG. 16; 428/215; 428/475.8; 428/476.1; 428/476.3; 428/483; 428/492; 428/510; 428/515; 428/520; 428/521; 428/522
[58] Field of Search ........................... 152/510, DIG. 16, 152/511, 450; 428/474.4, 332, 475.8, 476.1, 476.3, 517, 500, 492, 213, 215, 483, 515, 520, 519, 521, 522

[56] References Cited

U.S. PATENT DOCUMENTS

| | | |
|---|---|---|
| 3,650,669 | 3/1972 | Osborn et al. ............................. 8/115.2 |
| 5,040,583 | 8/1991 | Lin et al. . |
| 5,156,921 | 10/1992 | Lin et al. . |

(List continued on next page.)

FOREIGN PATENT DOCUMENTS

| | | |
|---|---|---|
| 0 102 844 | 3/1984 | European Pat. Off. . |
| 0 506 348 A1 | 9/1992 | European Pat. Off. . |
| 53-106779 | 9/1978 | Japan . |

(List continued on next page.)

OTHER PUBLICATIONS

Database WPI, Section CH, Week 9140, Derwent Publications Ltd., London, GB; Class A35, AN 91–291510 & JP–A–03 193 312, Aug. 23, 1991.

(List continued on next page.)

*Primary Examiner*—D. S. Nakarani
*Assistant Examiner*—D. Lawrence Tarazano
*Attorney, Agent, or Firm*—Armstrong, Westerman, Hattori, McLeland & Naughton

[57] ABSTRACT

The invention provides a laminate suitable for use with a pneumatic tire having an inner liner or like air-impermeable layer capable of, for example, maintaining a requisite air pressure. The laminate I of the invention includes laminated films and a rubber layer (R), the laminated films being made of a gas barrier layer (A) and an adhesive layer (B), the layer (B) being provided on at least one side of the layer (A), the layer (A) being formed of at least one member selected from polyamide resins, polyester resins, polyarylate resins, polyamide-based alloys and polyester-based alloys, the laminated films being irradiated in at least one periphery with an electron beam, and the adhesive layer (B) being heat-bonded to the rubber layer (R). The laminate II of the invention includes laminated films and a rubber layer (R), the laminated films being made of a rubber-adhering layer (D), an adhesive layer (B) and a gas barrier layer (A), the layers (D), (B) and (A) being laminated in this order with a structure of at least three layers, the rubber-adhering layer (D) being formed of at least one polyolefin resin, the gas barrier layer (A) being formed of at least one member selected from polyamide resins, polyester resins, polyarylate resins, polyamide-based alloys and polyester-based alloys, the laminated films being irradiated in at least one periphery with an electron beam, and the rubber-adhering layer (D) being heat-bonded to the rubber layer (R).

12 Claims, 5 Drawing Sheets

U.S. PATENT DOCUMENTS 5,236,030  8/1993  Misawa et al. .
5,292,590  3/1994  Lin et al. .
5,686,505  11/1997  Kusano et al. .......................... 522/157

FOREIGN PATENT DOCUMENTS 6-40207  2/1994  Japan .
6-55682  3/1994  Japan .
1 420 955  1/1976  United Kingdom .
1458213  12/1976  United Kingdom .

OTHER PUBLICATIONS

Database WPI, Section CH, Week 9423, Derwent Publications Ltd., London, GB; Class A18, AN 94–188480 & JP–A–06 126 894, May 10, 1994.

LAMINATE GAS BARRIER LAYER FOR PNEUMATIC TIRES

The present invention relates to a laminate suitable for use, for example, with pneumatic tires having a gas-impermeable layer, such as an inner liner, which is capable of maintaining a requisite air pressure.

In accord with the current trends to arouse energy-saving concern, tackle measures against global warming arising from the release of carbon dioxide and conserve global environment, it has been earnestly desired to reduce the weight of automobiles and other machines using a fossil fuel as a power source.

Conventionally, pneumatic tires have been lined with an inner liner of materials having relatively low gas-impermeability such as halogenated butyl rubber or the like to maintain a requisite air pressure. However, halogenated butyl rubber raises a problem as associated with its great hysteresis loss. For example, referring to FIG. 1 attached hereto, a rubber portion b of the carcass layer, on vulcanization of a tire, may become zigzag at a boundary with an inner liner c, namely at a spacing f between carcass cords a, a. In this case, on rotation of the tire, the rubber of the inner liner c may be deformed together with the carcass layer. Consequently, there arises a problem of increased resistance to rotational motion. For this reason, usually an intermediate sheet of tie gum involving low hysteresis loss is laid between an inner liner of halogenated butyl rubber and a carcass layer to unite the two layers. Thus the thickness of a halogenated butyl rubber inner liner together with the thickness of the intermediate layer of tie gum adds up to a total thickness exceeding 1 mm (1,000 $\mu$m) which in turn contributes to increased weight of the tire.

Recently a new technique for reducing the weight of an inner liner in a tire was proposed. In the proposed pneumatic tire, a gas-impermeable layer such as a polyvinylidene chloride film, ethylene-vinyl alcohol copolymer film or the like is laminated over the inner periphery of the tire so as to form an adhesive layer therebetween such as a polyolefin film, aliphatic polyamide film, polyurethane film or the like (Japanese Unexamined Patent Publication No. 40207/1994).

However, if the inner liner disclosed in the publication is comprised of laminated films like a polyolefin film/gas-impermeable film/polyolefin film (intermediate layers omitted), the vulcanization temperature must be lowered to a range which does not fuse or damage the inner liner, because said laminated films melt and fracture at a usual vulcanization temperature (about 180° C. at the surface of inner liner in passenger car). Moreover, when a tire is held under a great load for a prolonged period, the laminated films of resins melting at 180° C. or higher (such as a polyamide resin, polyester resin or the like) would tend to peel off from the inner periphery of the tire because of low adhesion.

Further, if an ethylene-vinyl alcohol copolymer film or a polyvinylidene chloride film is used as a gas barrier layer (gas-impermeable layer) in the proposed tire, such film, which has low flexibility, tends to impair and readily become brittle on vulcanization. Moreover, the gas released from the rubber is liable to create bubbles and foams between the film and the rubber layer or within the film. For these reasons, the proposed tire is undesirable.

In view of the foregoing situation, an object of the invention is to provide a laminate comprising laminated films and a rubber layer, the laminate being suitable for use as a component of a pneumatic tire and having an air pressure retentivity sufficient to retain the required air pressure in the tire, and high heat resistance, endurance and strength, and the laminated films being bonded as a gas-impermeable layer to the rubber of carcass layer to reduce the weight of the tire.

According to the present invention, there is provided a laminate comprising laminated films and a rubber layer (R), the laminated films being comprised of gas barrier layer (A) and an adhesive layer (B), the layer (B) being provided on at least one side of the layer (A), the layer (A) being formed of at least one member selected from the group consisting of polyamide resins, polyester resins, polyarylate resins, polyamide-based alloys and polyester-based alloys, the laminated films being irradiated in at least one periphery with an electron beam, and the adhesive layer (B) being heat-bonded to the rubber layer (R) (hereinafter referred to as "laminate I").

According to the invention, there is also provided a laminate comprising laminated films and a rubber layer (R), the laminated films being comprised of a rubber-adhering layer (D), an adhesive layer (B) and a gas barrier layer (A), the layers (D), (B) and (A) being laminated in this order with a structure of at least three layers, the rubber-adhering layer (D) being formed of at least one polyolefin resin, the gas barrier layer (A) being formed of at least one member selected from the group consisting of polyamide resins, polyester resins, polyarylate resins, polyamide-based alloys and polyester-based alloys, the laminated films being irradiated in at east one periphery with an electron beam, and the rubber-adhering layer (D) being heat-bonded to the rubber layer (R) (hereinafter referred to as "laminate II").

The laminates I and II of the present invention are excellent in the adhesion to the rubber and in the mechanical strength (flex cracking resistance), air pressure retentivity, heat resistance, etc.

When a tire having the laminate I or II inside is vulcanized with heating at a temperature of, e.g. 180° C., the laminated films of the laminate, because of their high heat resistance, are unlikely to melt or fracture at their surface, resulting in an increased molding efficiency. The laminated films of the laminates I and II, which are tough although thin, contribute to reduced weight of the tire, and provide a tire with high endurance.

The gas barrier (A) having air pressure-retentivity is formed in the invention from at least one resin selected from the group consisting of polyamide resins, polyester resins, polyarylate resins, polyamide-based alloys and polyester-based alloys.

Examples of useful polyamide resins are aliphatic polyamide resins, amorphous polyamide resins, aromatic polyamide resins, and blends thereof.

Useful aliphatic polyamide resins can be any of suitable resins having no aromatic ring in the main chain and/or side chain. Specific examples are nylon 6, nylon 66, nylon 610, nylon 12 and like polyamides, nylon 6-66 copolymers, nylon 6-610 copolymers and like copolyamides, nylon 66-polyethylene glycol block copolymers, nylon 6-polypropylene glycol block copolymers and like polyamide-based elastomers.

Useful aromatic polyamide resins can be any of suitable resins having an aromatic ring in the main chain and/or side chain, such as polyxylylene-based polymers prepared by polycondensation of meta- or para-xylylenediamine with a dicarboxylic acid having 4 to 12 carbon atoms. Such polymers have characteristics such as gas barrier properties, low water-absorbing capacity, low moisture permeability, etc.

The term "amorphous polyamide resins" used herein refers to non-crystallizable or scarcely crystallizable polyamide resins but without specific limitation. Specific examples are copolymers or terpolymers composed of terephthalic acid, isophthalic acid or like dicarboxylic acids and hexamethylenediamine or like diamines. Such amorphous polyamide resins are excellent in the gas barrier properties at high humidities.

Useful polyester resins include, for example, polyester-based resins composed of a dicarboxylic acid component and a diol component. Examples of dicarboxylic acid components are aliphatic dicarboxylic acids, aromatic dicarboxylic acids, alicyclic dicarboxylic acids and mixtures thereof. More specific examples of aliphatic dicarboxylic acids are adipic acid, sebasic acid, dodecanoic acid, etc. which have 2 to 20 carbon atoms. Useful aromatic dicarboxylic acids are, for example, terephthalic acid, isophthalic acid, naphthalenedi-carboxylic acid, etc. Useful alicyclic dicarboxyic acids are, for example, cyclohexanedicarboxylic acid, etc. Useful diol components are aliphatic glycols, alicyclic glycols and mixtures thereof. Specific examples of aliphatic glycols are ethylene glycol, 1,3-propanediol, 1,4-butanediol, 1,6-hexanediol, 1,10-decanediol, etc. Specific examples of alicyclic glycols are 1,4-cyclohexanediol, etc; Polyester resins for use in the invention include, for example, polybutylene terephthalate-polytetramethylene oxide glycol block copolymers, polybutylene terephthalate-polycaprolactone block copolymers, etc.

Useful polyarylate resins are, for example, polyesters of bivalent phenol with aromatic dibasic acid, etc. More specific examples include copolymers of bisphenol A with terephthalic acid/isophthalic acid, etc.

Examples of polyamide-based alloys and polyester-based alloys are polymer-based alloys prepared by kneading a sea component and an island component, optionally in the presence of a compatibilizing agent. The sea component to be used in the invention is at least one member selected from said polyamide resins and polyester resins, and the island component to be used in the invention is at least one member selected from suitable thermoplastic resins such as polyphenylene ether (PPE), polyarylate (PAR) and polycarbonate (PC). The foregoing sea and island components can be used vice versa. Preferred examples of polymer-based alloys are those having a sea-island structure, such as polyphenylene ether/polyamide alloy, polyarylate/polyamide alloy, polycarbonate/polyamide alloy, polyphenylene ether/polyester alloy, polyarylate/polyester alloy and polycarbonate/polyester alloy. Optionally a suitable third component may be added to the polyamide resins, polyester resins, polyarylate resins, or alloys. In the practice of the invention, it is possible to use polymer-blended alloys other than the polymer-based alloys of sea-island structure. These alloys are included in the range of alloys useful in the invention.

In the above preparation of alloys, useful compatibilizing agents are not critical and include, for example, block or random copolymers having an affinity for the sea component or the island component, styrene-maleic anhydride copolymers, polyphenylene ether-maleic anhydride-modified copolymers, arylate-maleic anhydride copolymers, epoxy-containing styrene polymers, etc. The amount of the compatibilizing agent used is not specifically limited but usually in the range of about 1 to about 5% by weight based on the total amount of at least one member selected from polyamide resins and polyester resins, and at least one member selected from suitable thermoplastic resins such as polyphenylene ether (PPE), polyarylate (PAR) and polycarbonate (PC).

Of the above polyamide resins, nylon 6, nylon 66, etc. are preferable, and of the above polyester resins, polybutylene terephthalate (PBT), polyethylene terephthalate (PET), etc. are preferable. However, these resins are not limitative. Useful polyphenylene ethers are not specifically limited, and include polymers containing poly(2,6-dimethylphenylene oxide) as a main component and having an ether bond. Useful polyarylates include, for example, polyesters of bivalent phenol with aromatic dibasic acid, etc., such as polyesters of bisphenol A with terephthalic acid/isophthalic acid. Useful polycarbonates are polymers prepared by interfacial polycondensation of sodium salt of bisphenol A with phosgene, or polymers prepared by ester exchange of bisphenol A with diphenyl carbonate.

Useful resins for forming the gas barrier layer (A) in the invention include, for example, polyamide resins, polyester resins, polyarylate resins, polyamide-based alloys and polyester-based alloys. These resins can be used singly or in mixture with each other.

The adhesive layer (B) formed in the invention is provided to adhere to the gas barrier layer (A) and the rubber layer (R) or to adhere to the gas barrier layer (A) and the rubber-adhering layer (D). Typical adhesive resins for producing the adhesive layer (B) include, for example, modified polymers prepared by copolymerizing or graft-copolymerizing a homopolymer or copolymer of olefins with maleic acid, fumaric acid, acrylic acid or like unsaturated carboxylic acid, anhydrides, esters, metal salts or like derivatives thereof, and other modified polymers such as ethylene glycidyl methacrylate-methyl acrylate terpolymers, ethylene-ethyl acrylate-maleic anhydride terpolymers, etc. The term "modified polymer" used herein includes a mixture of said modified polymers with other components such as other polyolefin resins. Further, these adhesive resins can be used in mixture with each other. A suitable adhesive agent can be used for forming the adhesive layer (B).

Examples of useful polyolefin resins as the component of said modified polymers are homopolymers of olefins, copolymers of olefins with each other, copolymers of olefins with other copolymerizable monomers, such as vinyl monomers, and mixtures thereof. More specific examples of such polyolefin resins are polyethylenes having low to high densities [including linear low-density polyethylenes (LLDPE), and very low-density polyethylenes (VLDPE)], polypropylene, polybutene, copolymers thereof with each other, ethylene-vinyl acetate copolymers (EVA), ethylene-ethyl acrylate copolymers (EEA), ethylene-acrylic acid copolymers (EAA), ethylene-methyl acrylate copolymers (EMA), ethylene-methyl methacrylate copolymers (EMMA), ethylene-methacrylic acid copolymers (EMAA), etc. In the present invention, these polyolefin resins can be used singly or at least two of them are usable in mixture. Polyolefin resins usable in the invention include mixtures of such polyolefin resins with a suitable elastomer, e.g. ethylene-propylene elastomer, a small amount of styrene elastomer or the like.

The rubber-adhering layer (D) formed in the invention is provided to adhere to the rubber layer or the like, for example, superposed on the inner periphery of a tire. Polyolefin resins for forming the rubber-adhering layer (D) are homopolymers of olefins, copolymers of olefins with each other, copolymers of olefins with other copolymerizable monomers, such as other vinyl monomers, and mixtures thereof. More specific examples of such polyolefin resins are polyethylenes having low to high densities (including linear low-density polyethylenes (LLDPE), and very low-density polyethylenes (VLDPE)), polypropylene, polybutene and copolymers thereof with each other, ethylene-vinyl acetate copolymers (EVA), ethylene-ethyl acrylate copolymers (EEA), ethylene-acrylic acid copolymers (EAA), ethylene-methyl acrylate copolymers (EMA), ethylene-methyl methacrylate copolymers (EMMA), ethylene-methacrylic acid copolymers (EMAA), etc. In the present invention, these polyolefin resins can be used singly or at least two of them are usable in mixture. Polyolefin resins usable in the invention include mixtures of such polyolefin resins with a suitable elastomer, e.g. ethylene-propylene elastomer, a small amount of styrene elastomer or the like.

There is no restriction on the composition of the rubber layer (R) (corresponding to the carcass layer in FIG. 3). Useful rubber compositions comprise at least one member selected from the group consisting of diene-based rubbers, hydrogenated diene-based rubbers, olefin-based rubbers, halogen-containing rubbers and thermoplastic elastomers. Examples of diene-based rubbers and hydrogenated diene-based rubbers are natural rubbers, polyisoprene rubbers, epoxidized natural rubbers, styrene-butadiene copolymer rubbers, polybutadiene rubbers (high-cis or low-cis butadiene rubbers), acrylonitrile-butadiene rubbers, hydrogenated acrylonitrile-butadiene rubbers, hydrogenated styrene-butadiene rubbers, etc. Typical of olefin-based rubbers are ethylene-propylene-diene terpolymer rubbers (EPDM, EPM, etc.), maleic acid-modified ethylene-propylene copolymer rubbers (M-EPM), butyl rubber (IIR), copolymers of isobutyrene and aromatic vinyl or diene-based monomers, etc. Exemplary of halogen-containing rubbers are butyl bromide rubbers, chlorinated butyl rubbers, bromide of isobutylene-p-methyl styrene copolymer (Br-IPMS), chlorosulfonated polyethylene (CSM), chlorinated polyethylene (CM), maleic acid-modified chlorinated polyethylene (M-CM), etc. Illustrative of thermoplastic elastomers are styrene-based elastomers, olefin-based elastomers and ester-based elastomers, etc. The rubber composition may contain additives such as carbon black, process oil, vulcanizing agents, etc. The rubber layer (R), although sufficient in strength, may contain reinforcements such as carcass cords embedded therein. The rubber layer (R) formed in the invention includes all of such rubber layers. A layer of suitable material may be deposited, of course, on the other side than the side of the rubber layer heat-bonded to the laminated films. The carcass layer 2 contains the rubber portion b (rubber coating) and the carcass cords a. However, in respect of the tires, the carcass layer 2 is treated herein as an equivalent of the rubber layer (R) to facilitate understanding.

Figure 1:
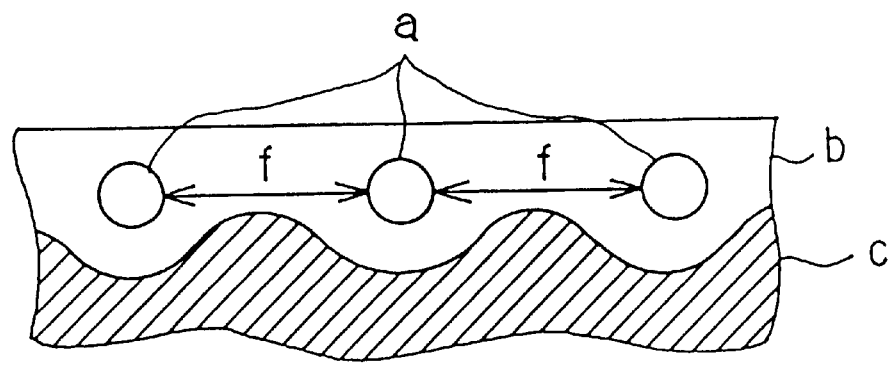
FIG. 1 is a schematic cross section showing a rubber portion of the carcass layer which may become zigzag at a boundary with an inner liner between carcass cords due to the vulcanization of a conventional tire.

In the drawings, a carcass cord is designated a; a rubber portion of the carcass layer, b; an inner liner, c; a bead core, 1; a carcass layer, 2; an inner liner, 3; a side wall, 4; a spliced portion, 5; a belt layer, 6; a gas barrier layer, (A); an adhesive layer, (B); and a rubber-adhering layer, (C).

The structure of the pneumatic tire according to the invention is described below in more detail with reference to FIG. 2.

Figure 2:
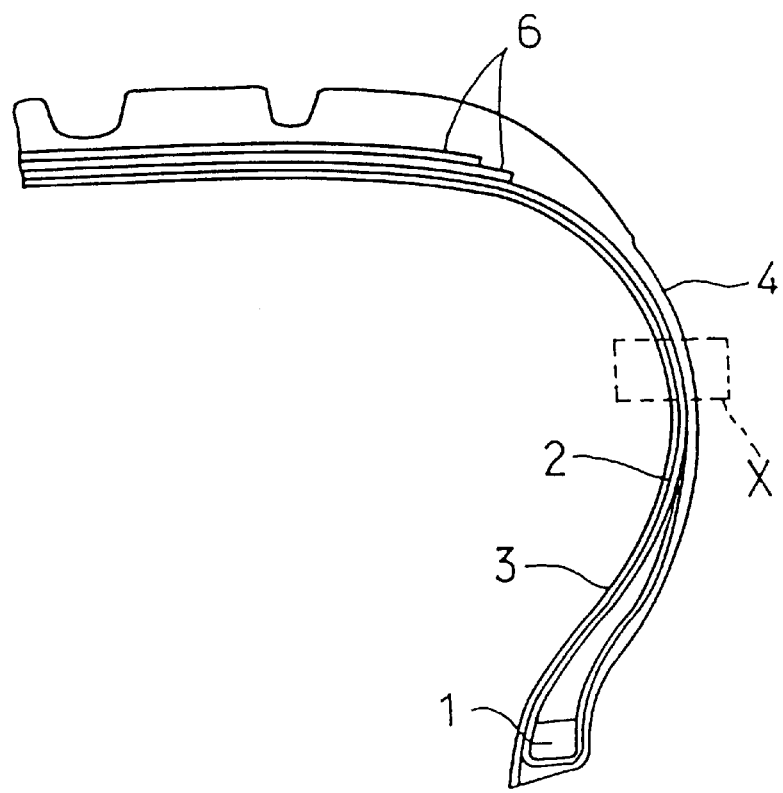
FIG. 2 is a fragmentary view showing the pneumatic tire of the invention in half section taken in the meridian direction.

In FIG. 2, a carcass layer 2 is laid between a pair of bead cores 1, 1 at left and right sides. An inner liner 3 is formed on the inner periphery of the carcass layer 2 inside of the tire, while a side wall 4 is disposed on the outer periphery of the carcass layer 2.

First, the laminate I is described below.

Figure 3:
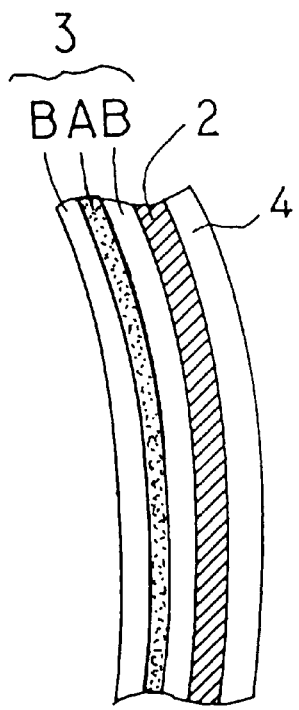
FIG. 3 is an enlarged sectional view of X portion of FIG. 2.

FIG. 3 is an enlarged sectional view of X portion of FIG. 2. An inner liner 3 is comprised of laminated films comprising a gas barrier layer (A) and an adhesive layer(s) (B). The adhesive layer (B) is made of a modified polyolefin resin or the like and is laminated on at least one surface of the gas barrier layer (A). The gas barrier layer (A) is formed of at least one member selected from the group consisting of polyamide resins, polyester resins, polyarylate resins, polyamide-based alloys and polyester-based alloys.

The adhesive layer (B) of the laminate I may be formed, as stated above, of a modified polyolefin resin. A modified polyolefin resin may melt or a film of this resin may fracture at a vulcanization temperature depending on the type of the resin. To avoid this objection, the adhesive layer (B) of the laminated films is essentially crosslinked for reinforcement in the practice of the invention. The crosslinking can be effected by irradiating one side or preferably both sides of the laminated films with an electron beam.

The thickness of the laminated films in the laminate I is at least 10 $\mu$m, preferably 25 to 200 $\mu$m, more preferably 50 to 150 $\mu$m. If the thickness is less than 10 $\mu$m, an increased air permeability results. For example, if the laminated films of such thickness are used for the inner liner of a pneumatic tire, the retentivity of air pressure is reduced, whereby it is made unlikely to maintain a requisite air pressure. The thickness of the laminated films is not specifically limited, and may be, of course, outside said range of film thickness, if necessary.

The thickness of the adhesive layer (B) to be bonded to the rubber layer (R) in the laminate I is in the range of 5 to 200 $\mu$m, preferably 10 to 100 $\mu$m, more preferably 15 to 80 $\mu$m. A thickness of less than 5 $\mu$m lowers the adhesion of the layer (B) to the rubber layer (R), whereas a thickness of more than 200 $\mu$m tends to make the layer (B) rigid. Thus the thickness outside said range is undesirable. The thickness of the gas barrier layer (A) should be sufficient, for example, to sustain a requisite air pressure. The thickness of the layer (A) is preferably at least 3 $\mu$m, more preferably 3 to 50 $\mu$m. A thickness of less than 3 $\mu$m decreases the air pressure retentivity, making it unlikely to maintain the required air pressure.

The thickness of the rubber layer (R) to be bonded to the adhesive layer (B) is variable depending on the purpose of use and is not specifically limited. For example, when the rubber layer is used as the carcass layer of the tire, a suitable thickness may be about 0.5 to abut 2.0 mm.

A preferred embodiment of the laminate I according to the invention comprises the rubber layer (R) and laminated films having at least 2-layer structure. For example, the adhesive layer (B) is laminated on the gas barrier layer (A) while the rubber layer (R) is laminated on the adhesive layer (B). That is to say, the embodiment has a structure of (A)/(B)/(R) or (B)/(A)/(B)/(R). Optionally the laminate (I)

may have at least one suitable intermediate layer sandwiched between the layers (A)/(B). A specific example of such structure is a combination of $(B_1)/(B_2)/(A)/(B_2)/(B_1)/(R)$. In this structure, the layers $(B_1)$ and $(B_2)$ may be, of course, made of the same or different adhesive resins.

To produce a tire using the laminate I, the laminate I is arranged, for example, on the inner periphery of the tire as described later, and the tire is vulcanized and molded in a suitable manner. In this case, the adhesive layer (B) is heat-bonded to the rubber layer (R) during vulcanization. In this way, usually the heating adhesion is performed concurrently with vulcanization. Of course, the heating adhesion may be carried out independently of vulcanization. The heating adhesion is effected preferably at a temperature of about 130 to about 200° C., but the temperature range is not critical.

A method of preparing the laminated films in the laminate I is described below.

The laminated films of the laminate I are formed in a tubular form by an inflation method or in a flat form by a T-die co-extrusion method, respectively using a proper device such as a co-extrusion device, without specific limitation. When required, the laminated films may be stretched. Stretching is carried out, for example, after preheating the laminated films cooled after the formation, by various methods such as sequentially biaxial stretching, concurrently biaxial stretching, concurrently biaxial tube-stretching, stretching by a separate procedure, melt-stretching, etc.

According to the invention, the draw ratio is not specifically limited. For example, the laminated films can be drawn to more than 1 times to 4 times, preferably more than 1 times to 2 times, the length and/or the width of the films. The drawing temperature is not critical, but usually in the range of about 100 to about 200° C., preferably about 120 to about 180° C.

Optionally the laminated films may be thermally fixed by conventional methods, as by being thermally fixed at a higher temperature than the drawing temperature after stretching while being relaxed widthwise of the films by several percents. However, the fixing method is not specifically limited.

Lamination methods are not critical in the practice of the invention and include various methods in addition to the co-extrusion method described above. For example, a pressure heating adhesion method is available which comprises separately forming an adhesive layer and a gas barrier layer, while optionally forming an anchor coating. Another extrusion lamination method is employable. It comprises depositing a melt of resins for forming an adhesive layer by extrusion on the surface of a gas barrier layer, while optionally forming an anchor coating.

According to the invention, the laminated films with the adhesive layer (B) superposed on at least one side of the gas barrier layer (A) are essentially crosslinked to improve the heat resistance and to increase the adhesion between the layers (A) and (B).

Preferably the crosslinking is conducted by irradiating at least one surface, preferably both surfaces, of the laminated films with an electron beam. In crosslinking the laminated films having the layers (B) on both sides thereof, the laminated films are desirably irradiated at both sides with an electron beam. Optionally an electron beam crosslinking agent, such as triallyl isocyanurate, triallyl cyanurate, trimethylol-propane trimethacrylate, etc. may be incorporated into a suitable layer of the laminated films. The amount of such crosslinking agent used is not critical, but is about 1 to about 5 parts by weight per 100 parts by weight of the material used for said layer. When an electron beam crosslinking agent is used, the exposure. dose can be reduced.

The laminated films are irradiated on at least one side with an electron beam in a dose of up to 40 Mrad, preferably 5 to 15 Mrad at an accelerating voltage of at least 150 kV, preferably 150 to 250 kV, more preferably 200 to 250 kV. When an electron beam crosslinking agent is used, the exposure dose is up to 40 Mrad, preferably 0.1 to 40 Mrad, more preferably 1 to 20 Mrad.

An accelerating voltage of less than 150 kV is unlikely to expose the laminated films to uniform irradiation of electron beam from the front side to the rear side of the films and is hence undesirable. An exposure dose exceeding 40 Mrad is liable to reduce the adhesion to the rubber layer (R) and is hence undesirable.

The laminated films thus irradiated with an electron beam are crosslinked at the layer (B) and are improved in the film strength and heat resistance.

To produce the pneumatic tire according to the invention, the laminated films are wound around a drum for forming a tire. Subsequently a carcass layer, a side wall, bead cores, bead apexes, a steel belt layer, and a tread rubber layer are laminated over each other in a conventional manner to form a green tire of unvulcanized rubber. Then the green tire is placed into a mold and vulcanized and molded in a conventional manner while the films are heat-bonded. In this way, an inner liner comprised of the laminated films can be superposed on the inner periphery of the carcass layer 2 inside the tire. It is possible in the practice of the invention to further incorporate a rubber layer (R') of tie gum or the like between the carcass layer 2 and the adhesive layer (B). In this structure, a combination of layers is partly shown as "carcass layer 2/rubber layer (R')/adhesive layer (B). . ." wherein the rubber layer (R) may be double arranged.

Figure 4:
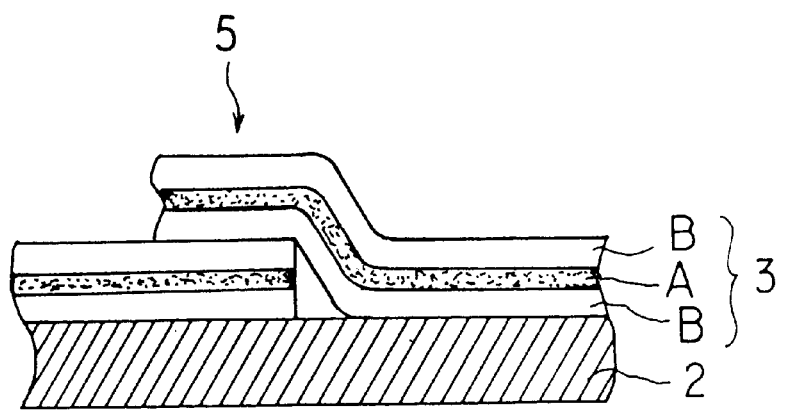
FIG. 4 is an enlarged sectional view showing a spliced portion of the inner liner in the tire of the invention.

When the adhesive layer (B) is formed at both peripheries of the inner liner 3, the adhesive layers (B), (B) are brought into contact with each other at a spliced portion 5 of the inner liner 3 as shown in FIG. 4. Thus the layers (B), (B) can be firmly bonded together when heated and the air pressure retentivity can be increased. Further, this structure can eliminate the possibility that a bladder placed inside the tire in vulcanization may come into direct contact with the gas barrier layer (A). Consequently the gas barrier layer (A) can be thermally and mechanically protected.

Figure 5:
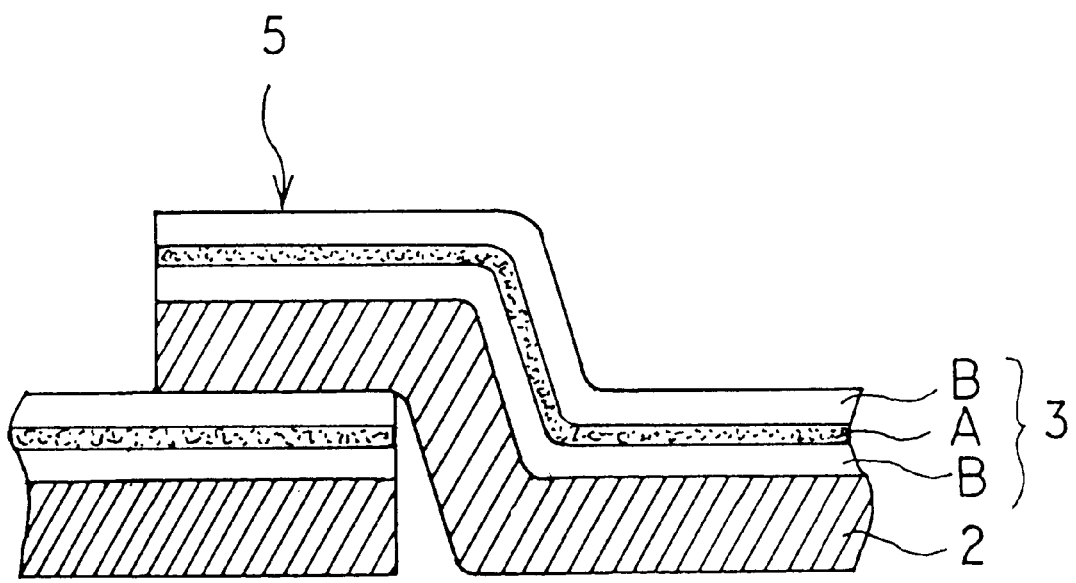
FIG. 5 is an enlarged sectional view showing another embodiment of the spliced portion of the inner liner in the tire of the invention.

Another tire forming method is available. The method comprises the steps of laminating the laminated films on the carcass layer 2, winding the prelaminated layer (laminated films plus carcass layer) around a tire forming drum, superposing a side wall, bead cores, bead apexes, a steel belt layer, and a tread rubber layer over each other in a conventional manner to give a green tire of unvulcanized rubber, placing the green tire into a mold, and vulcanizing the green tire in a conventional manner while the films are heat-bonded. In this case, when the adhesive layer (B) is arranged at both peripheries of the laminate I, it is possible to prevent the gas barrier layer (A) from being directly heat-bonded to the carcass layer 2 at the spliced portion 5 of the inner liner 3 as shown in FIG. 5. In this case, a high adhesion can be imparted.

The foregoing inner liner is a layer capable of inhibiting the penetration of a gas, as set forth above and may be formed at an intermediate portion of a pneumatic tire although termed with a restrictive word "inner".

Next, the laminate II is described below.

Figure 6:
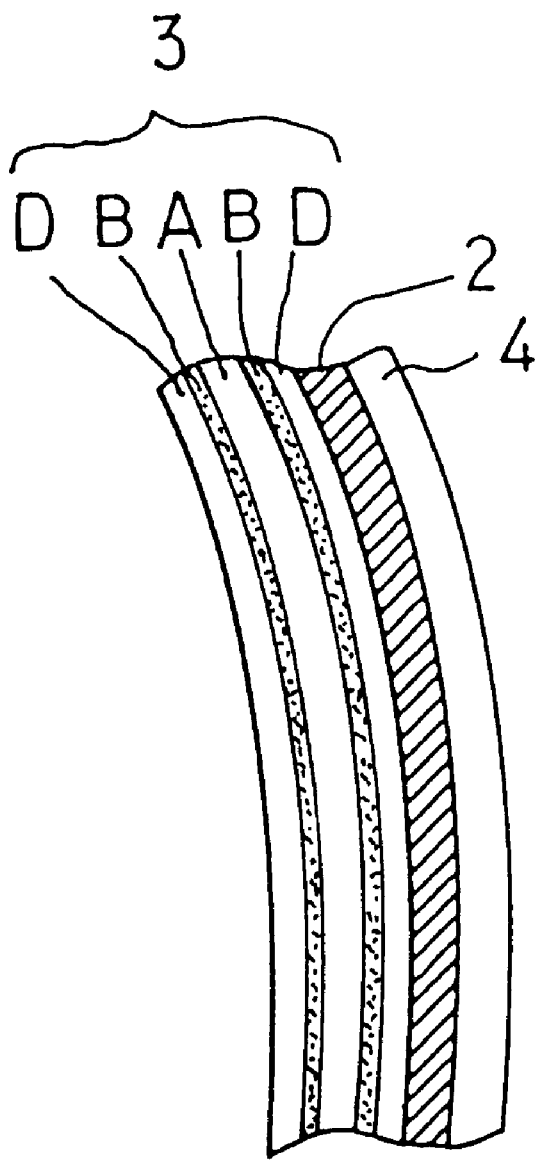
FIG. 6 is an enlarged sectional view of X portion of FIG. 2.

FIG. 6 is an enlarged view of X portion of FIG. 2. An inner liner 3 is comprised of laminated films comprising a gas barrier layer (A), adhesive layers (B) and rubber-adhering layers (D). The gas barrier layer (A) is formed of at least one member selected from the group consisting of polyamide resins, polyester resins, polyarylate resins, polyamide-based alloys and polyester-based alloys. The adhesive layer (B) is made of a modified polyolefin resin or the like and is laminated on both peripheries of the gas barrier layer (A). The layer (D) is formed of a polyolefin resin or the like and may be laid on both peripheries of the layer (B). The layer (B) is bonded indirectly to the carcass layer 2 since the layer (D) is interposed therebetween.

The rubber-adhering layer (D) of polyolefin resin in the laminate II may pose a problem. A polyolefin resin may melt and the film of this resin may fracture at a vulcanization temperature depending on the type of the resin. To avoid this objection, the rubber-adhering layer (D) and the adhesive layer (B) are essentially crosslinked for reinforcement. The crosslinking can be effected by irradiating one periphery, preferably both peripheries, of the laminated films with an electron beam.

The thickness of the laminated films essentially having the rubber layer (D) in the laminate II is 20 to 300 $\mu$m, preferably 25 to 200 $\mu$m, more preferably 50 to 150 $\mu$m. If the thickness is less than 20 $\mu$m, an increased air permeability results. For example, if the laminated films of such thickness are used for the inner liner of a pneumatic tire, the retentivity of air pressure is reduced, whereby it is made unlikley to maintain a requisite air pressure. A thickness of more than 300 $\mu$m is unliable to impart the desired flexibility. Thus a greater or smaller thickness of the laminated films in the laminate II than said range is undesirable.

The thickness of the rubber-adhering layer (D) to be bonded to the rubber is in the range of 5 to 200 $\mu$m, preferably 10 to 100 $\mu$m, more preferably 15 to 80 $\mu$m. A thickness of less than 5 $\mu$m lowers the adhesion-of the layer (D) to the rubber, whereas a thickness of more than 200 $\mu$m tends to make the layer (D) rigid. Hence the thickness outside said range is undesirable. The thickness of the adhesive layer (B) in the laminate II is in the range sufficient to bond the layer (D) to the layer (A), and is preferably up to 3 $\mu$m. The thickness of the gas barrier layer (A) is in the range sufficient, for example, to retain a requisite air pressure, and is preferably at least 3 $\mu$m, preferably 3 to 50 $\mu$m. A thickness of less than 3 $\mu$m reduces the air pressure retentivity, resulting in an unlikelihood of maintaining a requisite air pressure. Therefore, the thickness of the layer (A) outside said range is undesirable.

The thickness of the rubber layer (R) to be bonded to the rubber-adhering layer (D) is variable depending on the purpose of use and is not specifically limited. For example, when the rubber layer is used as the carcass layer of the tire, a suitable thickness may be about 0.5 to about 2.0 mm.

A preferred embodiment of the laminate II according to the invention comprises laminated films having the following structure. The adhesive layer (B) is present between the gas barrier layer (A) and rubber-adhering layer (D). The layers (D), (D) are provided as two external layers and the rubber layer (R) can be further laminated thereon. That is, the embodiment has a structure of (D)/(B)/(A)/(B)/(D)/(R), or (A)/(B)/(D)/(R). The laminate (II) may have a suitable intermediate layer, optionally two or more intermediate layers, interposed between the layers (D)/(B)/(A). A specific example of such structure is a combination of (A)/($B_1$)/($B_2$)/(D)/(R). In this structure, the layers ($B_1$) and ($B_2$) may be, of course, made of the same or different adhesive resins.

To produce a tire using the laminate II, the laminate II is mounted, for example, on the inner periphery of the tire as described later, and the tire is vulcanized in a suitable manner. In the practice of the invention, the rubber-adhering layer (D) is heat-bonded to the rubber layer (R) during vulcanization. In this way, usually the heating adhesion is performed concurrently with vulcanization. Of course, the heating adhesion may be carried out independently of vulcanization. The heating adhesion is effected preferably at a temperature of about 130 to about 200° C., but the temperature range is not critical.

A method of preparing the laminated films in the laminate II is described below.

The laminated films of the laminate II are formed in a tubular form by an inflation method or in a flat form by a T-die co-extrusion method, respectively using a proper device such as a co-extrusion device, without specific limitation. When required, the laminated films may be stretched. Stretching is carried out, for example, after preheating the laminated films cooled after the formation, by various methods such as sequentially biaxial stretching, concurrently biaxial stretching, concurrently biaxial tube-stretching, stretching involving a separate procedure, melt-stretching etc.

According to the invention, the draw ratio is not specifically limited. For example, the laminated films can be drawn to more than 1 to 4 times, preferably more than 1 to 2 times, the length and the width respectively of the film. The drawing temperature is not critical, but usually in the range of about 100 to about 200° C., preferably about 120 to about 180° C.

When required, the laminated films may be thermally fixed by conventional methods, as by being thermally fixed at a higher temperature than the drawing temperature after stretching while being relaxed widthwise of the films by several percents. However, the fixing method is not specifically limited.

Lamination methods are not critical in the practice of the invention and include various methods in addition to the co-extrusion method described above. For example, a pressure heating adhesion method is available which comprises separately forming a rubber-adhering layer and a gas barrier layer so as to produce an adhesive layer between said layers. There is a dry laminating method comprising laminating layers and forming intermediate layers of an adhesive agent therebetween. Another extrusion lamination method is employable. It comprises depositing a melt of resins for rubber-adhering layers by extrusion on the surface of a gas barrier layer so as to produce adhesive layers between the layers.

It is essential in the invention, as described hereinbefore, to crosslink the laminated films in order to improve the heat resistance.

Preferably the crosslinking is conducted by irradiating at least one surface of the laminated films with an electron beam. In crosslinking the laminated films having the layer (D) on both sides thereof, the laminated films are desirably irradiated at both sides with an electron beam. Optionally an electron beam crosslinking agent, such as triallyl isocyanurate, triallyl cyanurate, trimethylolpropane trimethacrylate, etc. may be incorporated into a suitable layer of the laminated films. The amount of such crosslinking agent used is not critical, but is about 1 to about 5 parts by weight per 100 parts by weight of the material used for said layer. When an electron beam crosslinking agent is used, the exposure dose can be reduced.

The laminated films are irradiated on at least one side with an electron beam in a dose of up to 40 Mrad, preferably 5 to 15 Mrad at an accelerating voltage of at least 150 kV, preferably 150 to 250 kV, more preferably 200 to 250 kV. When an electron beam crosslinking agent is used, the exposure dose is up to 40 Mrad, preferably 0.1 to 40 Mrad, more preferably 1 to 20 Mrad.

An accelerating voltage of less than 150 kV is unlikely to expose the laminated films to uniform irradiation of electron beam from the front side to the rear side of the films and is hence undesirable. An exposure dose exceeding 40 Mrad is liable to reduce the adhesion to the rubber layer (R) and is hence undesirable.

The laminated films thus irradiated with an electron beam are crosslinked at the rubber-adhering layer (D) and the adhesive layer (B) and are improved in the film strength and heat resistance.

To produce the pneumatic tire according to the invention, the laminated films are wound around a drum for forming a tire. Subsequently a carcass layer, a side wall, bead cores, bead apexes, steel belt layer, and a tread rubber layer are laminated over each other in a conventional manner to form a green tire of unvulcanized rubber. Then the green tire is placed into a mold and vulcanized while the films are heat-bonded in a conventional manner. In this way, the inner liner 3 comprised of the laminated films can be superposed on the inner periphery of the carcass layer 2 inside the tire. It is possible in the practice of the invention to incorporate a rubber layer (R') of tie gum or the like between the carcass layer 2 and the rubber-adhering layer (D). In this structure, a combination of layers is partly shown as "carcass layer 2/rubber layer (R')/rubber-adhering layer (D). . ." wherein the rubber layer (R) may be double arranged.

Figure 7:
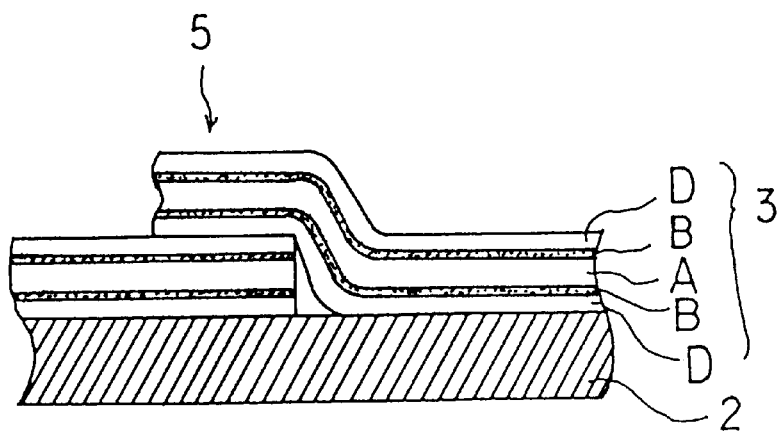
FIG. 7 is an enlarged sectional view showing the spliced portion of the inner liner in the tire of the invention.

When the rubber-adhering layer is formed at both peripheries of the inner liner 3, the layers (D), (D) are brought into contact with each other at a spliced portion 5 of the inner liner 3 as shown in FIG. 7. Thus the layers (D), (D) can be firmly bonded together when heated and the air pressure retentivity can be increased. Further, this structure can eliminate the possibility that a bladder placed inside the tire in vulcanization may come into direct contact with the gas barrier layer (A). Consequently the gas barrier layer (A) can be thermally and mechanically protected.

Figure 8:
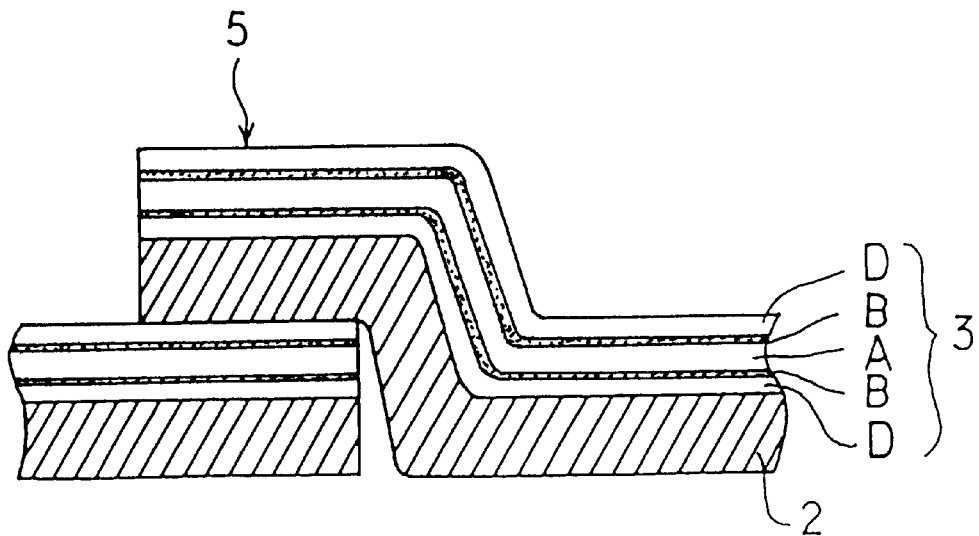
FIG. 8 is an enlarged sectional view showing another embodiment of the spliced portion of the inner liner in the tire of the invention.

Another tire forming method is usable. It comprises the steps of laminating the laminated films on the carcass layer 2, winding the prelaminated layer (laminated films plus carcass layer) around a tire forming drum, superposing a side wall, bead cores, bead apexes, a steel belt layer, and a tread rubber layer over each other in a conventional manner to give a green tire of unvulcanized rubber, placing the green tire into a mold, and vulcanizing the green tire in a conventional manner while the films are heat-bonded. In this case, when the rubber adhering layer (D) is arranged at both peripheries of the laminate II, it is possible to prevent the gas barrier layer (A) from being directly heat-bonded to the carcass layer 2 at the spliced portion 5 of the inner liner 3 as shown in FIG. 8, whereby a high adhesion can be imparted.

The foregoing inner liner is a layer capable of inhibiting the penetration of a gas, as set forth above and may be formed at an intermediate portion of a pneumatic tire, irrespectively of a restrictive word "inner".

Described above are preferred embodiments of the present invention to which the invention, however, is not limited at all. It is a matter of course that other embodiments are employable and various modifications are possible without the deviation from the scope of the invention.

According to one aspect of the invention, there is provided a laminate comprising laminated films and a rubber layer (R), the laminated films being comprised of a gas barrier layer (A) and an adhesive layer (B), the layer (B) being provided on at least one side of the layer (A), the layer (A) being formed of at least one member selected from the group consisting of polyamide resins, polyester resins, polyarylate resins, polyamide-based alloys and polyester-based alloys, the laminated films being irradiated in at least one periphery with an electron beam, and the adhesive layer (B) being heat-bonded to the rubber layer (R).

According to another aspect of the invention, there is also provided a laminate comprising laminated films and a rubber layer (R), the laminated films being comprised of a rubber-adhering layer (D), an adhesive layer (B) and a gas barrier layer (A), the layers (D), (B) and (A) being laminated in this order with a structure of at least three layers, the rubber layer (R) being formed of at least one polyolefin resin, the gas barrier layer (A) being formed of at least one member selected from the group consisting of polyamide resins, polyester resins, polyarylate resins, polyamide-based alloys and polyester-based alloys, the laminated films being irradiated in at least one periphery with an electron beam, and the rubber-adhering layer (D) being heat-bonded to the rubber layer (R).

The laminated films of the laminates I and II are irradiated with an electron beam on at least one periphery thereof. The laminates I and II are excellent in the film strength, adhesion to the rubber, gas impermeability (gas barrier properties), heat resistance, etc. These laminates can be used as the inner layer of a pneumatic tire (e.g. inner liner+carcass layer) and contribute to reduced weight of the tire.

Examples and Comparative Examples are given below to clarify the invention in more detail. The invention, however, is not limited to the Examples at all.

EXAMPLES 1 to 4 and COMPARATIVE EXAMPLE 1

Adhesion Test

The laminated films were subjected to confirmatory tests for the adhesion to rubbers.

(1) Composition and Preparation of Test Rubbers

The composition of test rubbers is shown below in Table 1.

(i) Preparation of Test Rubbers with Compositions 1 to 7:

Masterbatches were made by mixing together the other components than a vulcanizing accelerator and sulfur using a closed type mixer. The standard mixing time was 3.5 minutes and the maximum temperature for mixing was 150° C. The other components were added to each masterbatch using an open roll, giving an unvulcanized test rubber.

(ii) Preparation of Test Rubbers with Composition 8:

Masterbatches were made by mixing together the other components than zinc flower, a vulcanizing accelerator and sulfur using a closed type mixer. The standard mixing time was 3.5 minutes and the maximum temperature for mixing was 150° C. The other components were added to each masterbatch using an open roll, giving an unvulcanized test rubber.

TABLE 1

|  | Comp. 1 | Comp. 2 | Comp. 3 | Comp. 4 | Comp. 5 | Comp. 6 | Comp. 7 | Comp. 8 |
|---|---|---|---|---|---|---|---|---|
| NR | 100 |  |  | 65 | 50 |  | 40 | 25 |
| SBR |  | 100 |  | 20 |  | 80 |  | 25 |
| BR |  |  | 100 | 15 | 50 | 20 | 30 |  |
| EPT |  |  |  |  |  |  | 30 |  |
| Br-IIR |  |  |  |  |  |  |  | 50 |
| Carbon black FEF | 50 | 50 | 50 | 50 | 50 | 50 | 50 | 50 |
| Aromatic oil | 8 | 8 | 8 | 8 | 8 | 8 | 8 | 8 |
| ZnO | 5 | 5 | 5 | 5 | 5 | 5 | 3 | 5 |
| Stearic acid | 3 | 3 | 3 | 3 | 3 | 3 | 1 | 3 |
| RD | 1 | 1 | 1 | 1 | 1 | 1 | 1 | 1 |
| DM | 1 | 1 | 1 | 1 | 1 | 1 | 1 | 1 |
| Sulfur | 2 | 2 | 2 | 2 | 2 | 2 | 2 | 2 |

Note: Comp. = Composition

The components shown in Table 1 are specifically set forth below.

NR: trade name "RSS #1"

SBR: trade name "NIPOL 1502," product of Nippon Zeon Co., Ltd.

BR: trade name "NIPOL BR 1220," product of Nippon Zeon Co., Ltd.

EPT: trade name "ESPLEIN 505 A," product of Sumitomo Chemical Co., Ltd.

Br-IIR: trade name "EXXON BROMOBUTYL 2244," product of Exxon Chemical Japan Ltd.

Carbon Black FEF: trade name "HTC 100," product of Chubu Carbon Co., Ltd.

RD: trade name "NOCRAC 224," (antioxidant), product of Oh-uchi Shinko Chemical Industrial Co., Ltd.

DM: trade name "NOCCELLER DM," (vulcanizing accelerator), product of Oh-uchi Shinko Chemical Industrial Co., Ltd.

(2) Test Films

Three-layer laminated films were produced by laminating a gas barrier layer (A) and adhesive layers (B) each formed from the components shown in Table 2. The laminated films were prepared by co-extrusion and irradiated at both sides with an electron beam in a dose of 15 Mrad at an accelerating voltage of 200 kV. The thickness of the laminated films was 96 μm ((B)/(A)/(B)=30/36/30 μm). The laminated films of Comparative Example 1 were not exposed to an electron beam since the films were heat resistant.

(3) Preparation of Samples for Adhesion Test and Method of Adhesion Test

Samples were prepared and tested according to JIS K 6256. The samples were prepared by laminating rubber layers in the order of fabric-reinforced rubber/unvulcanized test rubber/test film/unvulcanized test rubber/fabric-reinforced rubber. The laminated films were vulcanized at 180° C. for 10 minutes and cut to 25 mm-wide rectangular sheets. The samples were placed on a peel tester, and the tester was operated with a gripper movable at a speed of 50.0±5.0 mm/min to measure the peel strength between the laminated films and the test rubber. The other tests were carried out according to JIS K6256. Table 2 shows the results of adhesion test.

TABLE 2

| Film structure | Example 1 | Example 2 | Example 3 | Example 4 | Com. Ex. 1 |
|---|---|---|---|---|---|
| Layer (A) (Gas barrier layer) Thickness = 36 μm | Nylon 66 | Polyphenylene ether-poly-amide (nylon 6) alloy* | Nylon 6 | Polyphenylene ether-poly-amide (nylon 6) alloy* | Nylon 66 |
| Layer (B) (Adhesive layer) Thickness = 30 μm | Ethylene-ethyl acrylate-maleic anhydride terpolymer | Ethylene-ethyl acrylate-maleic anhydride terpolymer | Ethylene-glycidyl methacrylate-methyl acrylate terpolymer | Ethylene-glycidyl methacrylate-methyl acrylate terpolymer | Nylon 6-66 |

Note: *"ARTLEY Y 20S," product of Sumitomo Chemical Co., Ltd.

| Adhesive strength | Example 1 | Example 2 | Example 3 | Example 4 | Com. Ex. 1 |
|---|---|---|---|---|---|
| Comp. 1 | 1.58 | 1.62 | 2.05 | 2.10 | 0.33 |
| Comp. 2 | 2.52 | 2.45 | 3.08 | 3.00 | 0.48 |
| Comp. 3 | 2.33 | 2.27 | 2.82 | 2.88 | 0.45 |
| Comp. 4 | 1.89 | 1.63 | 2.44 | 2.52 | 0.38 |
| Comp. 5 | 1.85 | 1.82 | 2.26 | 2.30 | 0.39 |
| Comp. 6 | 1.52 | 1.48 | 1.85 | 1.78 | 0.28 |

TABLE 2-continued

| | | | | | |
|---|---|---|---|---|---|
| Comp. 7 | 1.12 | 1.08 | 1.32 | 1.35 | 0.21 |
| Comp. 8 | 2.38 | 2.35 | 2.95 | 2.90 | 0.47 |

Note: Unit = N/mm

The desired adhesive strength between the test film and the test rubber is usually at least 0.5 N/mm. As apparent from Table 2, the films of Examples 1 to 4 exceeded said adhesive strength range while the film of Comparative Example 1 was below said adhesive strength range.

EXAMPLE 5

Three-layer laminated films for a tire with a size of 185/65 R14 were prepared by co-extrusion so as to laminate adhesive layers (B) of ethylene-ethyl acrylate-maleic anhydride terpolymer on both sides of a gas barrier layer (A) of nylon 66 in the structure of FIG. 2. The laminated films were irradiated at both sides with an electron beam in a dose of 15 Mrad at an accelerating voltage of 200 kV. The thickness of the laminated films was 96 μm ((B)/(A)/(B)=30/36/30 μm).

The laminated films thus obtained were used as an inner liner. An unvulcanized tire with said inner liner laminated on the carcass layer 2 was vulcanized at 180° C. for 10 minutes to heat-bond the adhesive layer (B) to the carcass layer 2, giving a finished tire. Table 3 shows the visual evaluation of the obtained tire, visual evaluation of the tire after indoor endurance test, results of air leakage test, and measurements of the tire weight.

TABLE 3

| | Example 5 | Example 6 | Example 7 | Example 8 |
|---|---|---|---|---|
| Inner liner | | | | |
| Layer (A) (gas barrier layer) Thickness = 36 μm | Nylon 66 | Polyphenylene ether/polyamide (nylon 6) alloy* | Nylon 6 | Polyphenylene ether/polyamide (nylon 6) alloy* |
| Layer (B) (adhesive layer) Thickness = 30 μm | Ethylene-ethyl acrylate-maleic anhydride terpolymer | Ethylene-ethyl acrylate-maleic anhydride terpolymer | Ethylene-glycidyl methacrylate-methyl acrylate terpolymer | Ethylene-glycidyl methacrylate-methyl acrylate terpolymer |
| Electron beam irradiation | Irradiated | Irradiated | Irradiated | Irradiated |
| Evaluation after vulcanization | Good | Good | Good | Good |
| Evaluation after indoor endurance test | Good | Good | Good | Good |
| Degree of air leakage (%/month) Tire weight | 2.0 | 2.2 | 2.1 | 2.2 |
| (Kg) | 7.3 | 7.3 | 7.3 | 7.3 |
| (%) | (92.4) | (92.4) | (92.4) | (92.4) |

| | Comp. Example 2 | Comp. Example 3 | Comp. Example 4 |
|---|---|---|---|
| Inner liner | | | |
| Layer (A) (gas barrier layer) Thickness = 36 μm | Nylon 66 | Nylon 6-10 | Butyl rubber 500 μm in thickness |
| Layer (B) (adhesive layer) Thickness = 30 μm | Nylon 6-66 | Maleic anhydride-modified PP | |
| Electron beam irradiation | Non-irradiated | Non-irradiated | Non-irradiated |
| Evaluation after vulcanization | Impaired** | Impaired (film foamed) | Good |
| Evaluation after indoor endurance test | Impaired in inner liner face (unevaluated) | Impaired in inner liner face | Good |
| Degree of air leakage (%/month) Tire weight | 1.5 | 3.0 | 2.8 |
| (Kg) | 7.3 | 7.3 | 7.9 |
| (%) | (92.4) | (92.4) | (100) |

Note: *"ARTLEY Y 20S," product of Sumitomo Chemical Co., Ltd.
**The rubber layer and the layer (B) were peeled.

The rubber composition used for the carcass layer had the formulation as shown below in Table 4. The carcass layer had an array of polyester cords embedded in the rubber composition.

TABLE 4

| Component | Part by weight |
| --- | --- |
| Natural rubber | 80.0 |
| SBR 1502 | 20.0 |
| Carbon black FEF | 50.0 |
| Stearic acid | 2.0 |
| Zinc flower | 3.0 |
| Sulfur | 3.0 |
| Vulcanizing accelerator (NS) | 1.0 |
| Aromatic oil | 2.0 |

In the Examples, the laminated films were evaluated or measured by the following methods in respect of the test items indicated in the tables.

Evaluation After Vulcanization

The inner periphery of the tire was visually inspected and evaluated after vulcanization. If no abnormality was found, the result of evaluation was expressed with "Good". If an abnormality was detected, it was represented with a word "Impaired" and specifically described.

Evaluation After Indoor Endurance Test

The indoor endurance test was carried out under the following conditions by the method described below. The inner periphery of the tire was visually inspected after the test. A flawless tire was indicated with a word "Good", while an impaired tire was expressed with a word "Impaired". The impairment of the tire was specifically set forth.

The conditions for indoor endurance test, the test method, and the criteria for evaluation are as follows.

Rim: 14×5½-J

Air pressure: 140 kPa Load: 6 kN

Room temperature: 38° C.

The tire was let to travel at a speed of 80 km/h on a drum of 1707 mm in diameter. After travel over a distance of 10000 km, the inner periphery of the tire was visually evaluated. The tires were rated as rejects if cracking, flaking, floating layer or the like was detected.

Degree of Air Leakage

An air leakage test was performed as follows.

The tire was fitted on a rim measuring 14×5½-J at room temperature (21° C.) and let to stand still for 48 hours under an internal pressure of 200 kPa. Then the internal pressure was readjusted to 200 kPa. The internal internal pressure was measured every 4 days over a period of 3 months starting immediately after the readjustment.

An air leakage coefficient a was calculated according to the formula $$P_t/P_o = \exp(-\alpha t)$$

wherein $P_t$ is a measurement of pressure, $P_o$ is an initial pressure and t is the number of days.

A ratio (β) of reduction in the internal pressure over a period of one month (%/month) was calculated by substituting 30 (days) for t according to the equation $$\beta = [1 - \exp(-\alpha t)] \times 100$$

wherein β is the ratio of reduction in the internal pressure and t is the number of days.

EXAMPLES 6 to 8

The procedure of Example 5 was repeated with the exception of using an inner liner formed from-the components shown in Table 3. Table 3 shows the visual evaluation of the obtained tire, visual evaluation of the tire after indoor endurance test, results of air leakage test, and measurements of the tire weight.

COMPARATIVE EXAMPLE 2

A tire was produced in the same manner as in Example 5 with the exception of using an inner liner formed from the components shown in Table 3 without exposure to an electron beam. Table 3 shows the visual evaluation of the obtained tire, visual evaluation of the tire after indoor endurance test, results of air leakage test, and measurements of the tire weight.

COMPARATIVE EXAMPLE 3

A tire was produced in the same manner as in Example 5 with the exception of using an inner liner formed from the components shown in Table 3 without exposure to an electron beam. Table 3 shows the visual evaluation of the obtained tire, visual evaluation of the tire after indoor endurance test, results of air leakage test, and measurements of the tire weight.

COMPARATIVE EXAMPLE 4

A tire was prepared by laminating, on the inner periphery of a green tire, a 500 μm-thick inner liner of unvulcanized butyl rubber having the composition shown in Table 5 so as to form an intermediate layer of tie gum about 700 μm in thickness therebetween. The green tire was vulcanized under the same conditions as in Example 5. Table 3 shows the visual evaluation of the tire after vulcanization, visual evaluation of the tire after indoor endurance test, results of air leakage test, and measurements of the tire weight.

TABLE 5

| Component | Part by weight |
| --- | --- |
| Butyl bromide rubber | 100.0 |
| Carbon black FEF | 50.0 |
| Stearic acid | 1.0 |
| Zinc flower | 3.0 |
| Sulfur | 1.0 |
| Vulcanizing accelerator (DM) | 1.0 |
| Aromatic oil | 10.0 |

As apparent from Table 3, no impairment was found in the inner liners on the tires of Examples 5 to 8 after vulcanization and after indoor endurance test. These inner liners were comparable or superior in the degree of air leakage to inner liners of butyl rubber. A 7.6% decrease of the tire weight was realized by a ⅕ reduction in the thickness of the inner liners.

The tire of Comparative Example 2 produced without exposure to an electron beam was rated as unacceptable after indoor endurance test. Hence it was improper.

The inner liner of Comparative Example 3 produced without exposure to an electron beam created bubbles although otherwise in accord with the requirements of the invention and was evaluated as unacceptable after vulcanization. Hence it was improper.

EXAMPLES 9 and 10

The procedure of Example 5 was repeated except that the gas barrier layers (A) had the thicknesses shown in Table 6. Table 6 shows the visual evaluation of the obtained tire, visual evaluation of the tire after indoor endurance test, results of air leakage test, and measurements of the tire weight.

TABLE 6

|  | Example 9 | Example 10 |
| --- | --- | --- |
| Thickness of layer (A) | 3 μm | 50 μm |
| Electron beam irradiation | Irradiated | Irradiated |
| Evaluation after vulcanization | Good | Good |
| Evaluation after indoor endurance test | Good | Good |
| Degree of air leakage (%/month) | 2.7 | 1.6 |
| Tire weight (Kg) (%) | 7.3 (92.4) | 7.3 (9.4) |

EXAMPLES 11 to 13

The procedure of Example 5 was repeated with the exception of forming inner liners from the components shown in Table 7. Table 7 shows the visual evaluation of the obtained tire, visual evaluation of the tire after indoor endurance test, results of air leakage test, and measurements of the tire weight.

TABLE 7

| Inner liner | Example 11 | Example 12 | Example 13 |
| --- | --- | --- | --- |
| Layer (A) (gas barrier layer) Thickness = 36 μm | Polyethylene terephthalate * | Polyarylate ** | Polyphenylene ether-polyester (polybutylene terephthalate) alloy*** |
| Layer (B) (adhesive layer) Thickness = 30 μm | Ethylene-glycidyl methacrylate-methyl acrylate terpolymer | Ethylene-glycidyl methacrylate-methyl acrylate terpolymer | Ethylene-glycidyl methacrylate-methyl acrylate terpolymer |
| Electron beam irradiation | Irradiated | Irradiated | Irradiated |
| Evaluation after vulcanization | Good | Good | Good |
| Evaluation after indoor endurance test | Good | Good | Good |
| Degree of air leakage(%/month) | 1.7 | 1.8 | 2.0 |
| Tire weight (Kg) (%) | 7.3 (92.4) | 7.3 (92.4) | 7.3 (92.4) |

Note:
* product of Kanebo Ltd. "PET PEFG-13"
** product of Unitika Ltd. "U-Polymer U-8060"
***product of Mitsubishi Rayon Co., Ltd. "DIA•ALLOY TX-70A"

EXAMPLES 14 to 16 and COMPARATIVE EXAMPLE 5

Tires were produced in the same manner as in Example 5 except that the laminated films were produced by exposure to an electron beam in a dose of 5 Mrad, 20 Mrad and 40 Mrad, respectively at an accelerating voltage of 150 kV, 200 kV and 250 kV, respectively in Examples 14, 15 and 16, or without exposure to an electron beam in Comparative Example 5. Table 8 below shows the visual evaluation of the obtained tire, visual evaluation of the tire after indoor endurance test, results of air leakage test, and measurements of the tire weight.

TABLE 8

|  | Example 14 | Example 15 | Example 16 | Comp.Ex. -5 |
| --- | --- | --- | --- | --- |
| Accelerating voltage/ Exposure dose | 150 kV 5 Mrad | 200 kV 20 Mrad | 250 kV 40 Mrad | Non-irradiated |
| Evaluation after vulcanization | Good | Good | Good | Impaired * |
| Evaluation after indoor endurance test | Good | Good | Good | Un-evaluated** |
| Degree of air leakage (%/month) | 2.0 | 2.0 | 1.9 | 7.0 |
| Tire weight (Kg) (%) | 7.3 (92.4) | 7.3 (92.4) | 7.3 (92.4) | 7.3 (92.4) |

Note:
* = Melted and fractured
** = The inner liner surface was impaired (unevaluated).

As apparent from Table 8, the inner liners of the invention were kept from fracture due to the exposure to an electron beam. The resulting tires had inner liners excellent in the adhesion to the carcass layer.

EXAMPLES 17 and 18

Three-layer laminated films for a tire with a size of 185/65 R14 were prepared by co-extrusion so as to laminate adhesive layers (B) of ethylene-ethyl acrylate copolymer (100 parts by weight of copolymer used) containing 3 parts by weight of triallyl isocyanurate (TAIC) in the structure of FIG. 2 on both sides of a gas barrier layer (A) of nylon 66. The laminated films were irradiated at both sides with an electron beam under the conditions shown in Table 9. The thickness of the laminated films was 96 μm ((B)/(A)/(B)= 30/36/30 μm).

The laminated films thus obtained were used as inner liners. Unvulcanized tires with said inner liner laminated on the carcass layer 2 were vulcanized at 180° C. for 10 minutes to heat-bond the adhesive layer (B) to the carcass layer 2, giving a finished tire. Table 9 shows the visual evaluation of the obtained tire, visual evaluation of the tire after indoor endurance test, results of air leakage test, and measurements of the tire weight.

The rubber composition used for the carcass layer had the formulation as shown above in Table 4. The carcass layer had an array of polyester cords embedded in the rubber composition.

TABLE 9

|  | Example 17 | Example 18 |
| --- | --- | --- |
| Layer (A) (gas barrier layer) Thickness = 36 μm | Nylon 66 | Nylon 66 |
| Layer (B) (adhesive layer) Thickness = 30 μm | Ethylene-ethyl acrylate-maleic anhydride terpolymer/TAIC | Ethylene-ethyl acrylate-maleic anhydride terpolymer/TAIC |
| Accelerating voltage/Exposure dose | 150 kV 0.5 Mrad | 150 kV 3.0 Mrad |
| Evaluation after vulcanization | Good | Good |

TABLE 9-continued

|  | Example 17 | Example 18 |
|---|---|---|
| Evaluation after indoor endurance test | Good | Good |
| Degree of air leakage (%/month) | 1.9 | 1.9 |
| Tire weight | | |
| (Kg) | 7.3 | 7.3 |
| (%) | (92.4) | (92.4) |

As apparent from Table 9, because of TAIC incorporated in the adhesive layer (B), the inner liners of the invention were kept from fracture although exposed to only a small dose (0.5 Mrad) of an electron beam, and were imparted a high adhesion to the carcass layer.

EXAMPLE 19

Five-layer laminated films for a tire with a size of 185/65 R14 were formed by laminating, in the structure of FIG. 2, rubber-adhering layers (D) of ethylene-ethyl acrylate copolymer (EEA), adhesive layers (B) of ethylene-ethyl acrylate-maleic anhydride terpolymer (modified ethylene-acrylic acid copolymer) and a gas barrier layer (A) of nylon 66. The lamination was conducted as follows. A T-die was connected to 5 extruders independently operable. Among the five extruders, the resin for the rubber-adhering layers (D) was supplied to two extruders, the resin for the adhesive layers (B) to two extruders, and the resin for the gas barrier layer (A) to the other extruder. After co-extrusion, the molten laminated 5 layers were quenched with a roll cooled with water, giving laminated films of 5 flat layers with a structure of (D)/(B)/(A)/(B)/(D). The thickness of the laminated films was 100 μm ((D)/(B)/(A)/(B)/(D)=30/2/36/2/30 μm). Subsequently the laminated films were irradiated at both sides with an electron beam in a dose of 15 Mrad at an accelerating voltage of 200 kV, whereby the laminated films were crosslinked.

The laminated films thus obtained were used as an inner liner. An unvulcanized tire with said inner liner laminated on the carcass layer 2 was vulcanized at 180° C. for 10 minutes to heat-bond the rubber layer (D) to the carcass layer 2, giving a finished tire. Table 10. below shows the visual evaluation of the obtained tire, visual evaluation of the tire after indoor endurance test, results of air leakage test, and measurements of the tire weight.

TABLE 10

| Inner liner | Example 19 | Comp. Example 6 | Comp. Example 7 |
|---|---|---|---|
| Layer (D) Thickness = 30 μm | EEA | Nylon 6 | EVA |
| Layer (B) Thickness = 2 μm | Ethylene-ethyl acrylate-maleic anhydride terpolymer | Nylon 6-66 | LLDPE |
| Layer (A) Thickness = 36 μm | Nylon 66 | Nylon 66 | Nylon 66 |
| Electron beam irradiation | Irradiated | Irradiated | Irradiated |
| Evaluation after vulcanization | Good | Impaired* | Good |
| Evaluation after indoor endurance test | Good | Unevaluated** | Imparied*** |
| Degree of air leakage (%/month) | 2.0 | 1.5 | 2.6 |
| Tire weight | | | |
| (Kg) | 7.3 | 7.3 | 7.3 |
| (%) | (92.4) | (92.4) | (92.4) |

| Inner liner | Comp. Example 8 | Comp. Example 9 | Comp. Example 10 |
|---|---|---|---|
| Layer (D) Thickness = 30 μm | EVA | PP | Butyl rubber (Thickness = 500 μm) |
| Layer (B) Thickness = 2 μm | Maleic anhydride-modified EVA | Maleic anhydride-modified PP | |
| Layer (A) Thickness = 36 μm | EVOH | Nylon 6-10 | |
| Electron beam irradiation | Irradiated | Non-irradiated | Non-irradiated |
| Evaluation after vulcanization | Good | Impaired # | Good |
| Evaluation after indoor endurance test | Impaired ## | Unevaluated ### | Good |
| Degree of gas leakage (%/month) | 1.3 | 3.0 | 2.8 |
| Tire weight | | | |
| (Kg) | 7.3 | 7.3 | 7.9 |
| (%) | (92.4) | (92.4) | (100) |

Note: The abbreviations and emblems used in Table 10 represent:
EVA: ethylene-vinyl acetate copolymer.
PP: polypropylene.
LLDPE: linear low-density polyethylene.
EVOH: ethylene-vinyl alcohol copolymer.
*The rubber layer (R) and the layer (D) were peeled.
**The inner liner surface was impaired (unevaluated).
***The layers (B) and (A) were peeled.
The film was foamed.
The film was fractured.
The inner liner surface was impaired (unevaluated).

The rubber composition used for the carcass layer had the formulation as shown above in Table 4. The carcass layer had an array of polyester cords embedded in the rubber composition.

COMPARATIVE EXAMPLES 6 to 8

The procedure of Example 19 was repeated with the exception of forming inner liners from the components shown in Table 10. Table 10 shows the visual evaluation of the obtained tire, visual evaluation of the tire after indoor endurance test, results of air leakage test, and measurements of the tire weight.

COMPARATIVE EXAMPLE 9

A tire was produced by repeating the procedure of Example 19 with the exception of forming an inner liner from the components shown in Table 10 without exposure to an electron beam. Table 10 shows the visual evaluation of the obtained tire, visual evaluation of the tire after indoor endurance tester results of air leakage test, and measurements of the tire weight.

COMPARATIVE EXAMPLE 10

A tire was produced by laminating on the inner periphery of a green tire, a 500 μm-thick inner liner of unvulcanized butyl rubber having the formulation shown in Table 5 so as to form an intermediate layer of tie gum about 700 μm in thickness therebetween. The green tire was vulcanized under the same conditions as in Example 19. Table 10 shows the visual evaluation of the tire after vulcanization, visual evaluation of the tire after indoor endurance test, results of air leakage test, and measurements of the tire weight.

As apparent from Table 10, no impairment was found in the inner liner of Example 19 after vulcanization and after indoor endurance. The inner liner of Example 19 was comparable or superior in the degree of air leakage to inner liners of butyl rubber. A 7.6% decrease of the tire weight was realized by a ⅕ reduction in the thickness of the inner liner of Example 19.

In the inner liners of Comparative Examples 6 to 8, at least one of the layers (D), (B) and (A) deviated from the scope of the invention. The inner liners were found unacceptable after indoor endurance test. Hence they were improper.

The inner liner of Comparative Example 9, which met the structural requirements of the invention, caused bubbles because of non-exposure to an electron beam. The inner liner was evaluated as unacceptable after vulcanization. Namely it was improper.

EXAMPLE 20

A tire was produced in the same manner as in Example 19 except that the gas barrier layer (A) of the laminated films was composed of polyphenylene ether/polyamide (nylon 6) alloy ("ARTLEY Y 20S," product of Sumitomo Chemical Co., Ltd.). Table 11 shows the visual evaluation of the tire after vulcanization, visual evaluation of the tire after indoor endurance test, results of air leakage test, and measurements of the tire weight.

EXAMPLES 21 to 23

Tires were produced in the same manner as in Example 20 except that the gas barrier layer (A) of the laminated films was composed of polyethylene terephthalate, polyacrylate or polyphenylene ether/polyester (polybutylene terephthalate) alloy ("DIA·Alloy TX-70A," product of Mitsubishi Rayon Co., Ltd.), the rubber-adhering layer (D) was formed from an ethylene-methyl methacrylate copolymer (EMMA) and the adhesive layer (B) was made of low-density maleic anhydride-modified polyethylene. Table 11 below shows the visual evaluation of the tire after vulcanization, visual evaluation of the tire after indoor endurance test, results of air leakage test, and measurements of the tire weight.

TABLE 11

| Inner liner | Example 20 | Example 21 | Example 22 | Example 23 |
|---|---|---|---|---|
| Layer (D) thickness = 30 μm | EEA | EMMA | EMMA | EMMA |
| Layer (B) thickness = 2 μm | Ethylene-ethyl acrylate-maleic anhydride terpolymer | Low-density maleic anhydride-modified polyethylene | Low-density maleic anhydride-modified polyethylene | Low-density maleic anhydride-modified polyethylene |
| Layer (A) thickness = 36 μm | Polyphenylene ether/polyamide alloy | Polyethylene terephthalate | Polyacrylate | Polyphenylene ether/polyester alloy |
| Electron beam irradiation | Irradiated | Irradiated | Irradiated | Irradiated |
| Evaluation after irradiation | Good | Good | Good | Good |
| Evaluation after indoor endurance test | Good | Good | Good | Good |
| Degree of air leakage (%/month) | 2.2 | 1.7 | 1.8 | 2.0 |
| Tire weight (Kg) | 7.3 | 7.3 | 7.3 | 7.3 |
| (%) | (92.4) | (92.4) | (92.4) | (92.4) |

As apparent from Table 11, even when the gas barrier (A) of the laminated films in the tire was composed of polyphenylene ether/polyamide alloy, polyethylene terephthalate, polyacrylate or polyphenylene ether/polyester alloy, no impairment was found in the inner liners after vulcanization and after indoor endurance as in Example 19. The inner liners were comparable or superior in the degree of air leakage to the conventional inner liner of butyl rubber indicated in Comparative Example 6. A 7.6% decrease of the tire weight was achieved as a result of a ⅕ reduction in the thickness of the inner liner.

EXAMPLES 24 and 25

Tires were produced in the same manner as in Example 19 except that the gas barrier layers (A) of the laminated films used as the inner liners had the thicknesses indicated in Table 12. Table 12 shows the visual evaluation of the tire after vulcanization, visual evaluation of the tire after indoor endurance test, results of air leakage test, and measurements of the tire weight.

COMPARATIVE EXAMPLE 11

A tire was produced in the same manner as in Example 19 except that the gas barrier layer (A) of the laminated films used as the inner liner had the thickness indicated in Table 12. Table 12 shows the visual evaluation of the tire after vulcanization, visual evaluation of the tire after indoor endurance test, results of air leakage test, and measurements of the tire weight.

TABLE 12

| Inner liner | Example 24 | Example 25 | Comparative Example 11 |
|---|---|---|---|
| Thickness of layer (A) | 3 µm | 50 µm | 2 µm |
| Electron beam irradiation | Irradiated | Irradiated | Irradiated |
| Evaluation after vulcanization | Good | Good | Good |
| Evaluation after indoor endurance test | Good | Good | Good |
| Degree of air leakage (%/month) | 2.7 | 1.7 | 2.9 |
| Tire weight | | | |
| (Kg) | 7.3 | 7.3 | 7.3 |
| (%) | (92.4) | (92.4) | (92.4) |

As apparent from Table 12, when the gas barrier layer (A) of the laminated films was at least 3 µm in thickness, there was provided a tire which was comparable or superior in the air pressure retentivity to tires with inner liners of butyl rubber.

EXAMPLES 26 and 27

Tires were produced in the same manner as in Example 19 except that the gas barrier layers (A) of the laminated films were composed of the polyphenylene ether/polyamide alloy used in Example 20 and the polyphenylene ether/polyester alloy used in Example 23, respectively and had the thicknesses indicated in Table 13. Table 13 shows the visual evaluation of the tire after vulcanization, visual evaluation of the tire after indoor endurance test, results of air leakage test, and measurements of the tire weight.

TABLE 13

| Inner liner | Example 26 | Example 27 |
|---|---|---|
| Layer (A) | Polyphenylene ether/polyamide alloy | Polyphenylene ether/polyester alloy |
| Thickness of layer (A) | 3 µm | 3 µm |
| Electron beam irradiation | Irradiated | Irradiated |
| Evaluation after vulcanization | Good | Good |
| Evaluation after indoor endurance test | Good | Good |
| Degree of air leakage (%/month) | 2.7 | 2.6 |
| Tire weight | | |
| (Kg) | 7.3 | 7.3 |
| (%) | (92.4) | (92.4) |

As apparent from Table 13, even when the gas barrier layers (A) of the laminated films were composed of polyphenylene ether/polyamide alloy and polyphenylene ether/polyester alloy, respectively, the resulting tires with the layers (A) of at least 3 µm thickness were comparable or superior in the air pressure retentivity to the tire of Comparative Example 10 having the inner liner of butyl rubber, and were excellent in the heat resistance.

EXAMPLES 28 to 30

Five-layer laminated films for a tire with a size of 185/65 R14 were produced. The inner liners comprised rubber-adhering layers (D) of linear low-density polyethylene (LLDPE), adhesive layers (B) of linear low-density maleic anhydride-modified polyethylene (modified LLDPE), and a gas barrier layer (A) of nylon 66 in the structure as shown in FIG. 2. The lamination was conducted as follows. A T-die was connected to 5-extruders independently operable. Among the five extruders, the resin for the rubber-adhering layers (D) was supplied to two extruders, the resin for the adhesive layers (B) to two extruders, and the resin for the gas barrier layer (A) to the other extruder. After co-extrusion, the molten laminated 5 layers were quenched with a roll cooled with water, giving laminated films composed of 5 flat layers with a structure of (D)/(B)/(A)/(B)/(D). The thickness of the laminated films was 100 µm ((D)/(B)/(A)/(B)/(D)=30/2/36/2/30 µm). Subsequently the laminated films were irradiated at both sides with an electron beam in a dose of 5, 20 and 40 Mrad at an accelerating voltage of 150, 200 and 250 kV, respectively as shown in Table 14. Tires were produced by the same subsequent procedure as in Example 19. Table 14 below shows the visual evaluation of the tire after vulcanization, visual evaluation of the tire after indoor endurance test, results of air leakage test, and measurements of the tire weight.

COMPARATIVE EXAMPLES 12 to 14

Tires were produced in the same manner as in Examples 28 to 30 with the exception of difference in non-exposure or exposure to an electron beam in a dose of 4 or 45 Mrad at an accelerating voltage of 140 or 250 kV as shown in Table 14. Table 14 shows the visual evaluation of the tire after vulcanization, visual evaluation of the tire after indoor endurance test, results of air leakage test, and measurements of the tire weight.

TABLE 14

| | Example 28 | Example 29 | Example 30 | Comp. Ex. 12 | Comp. Ex. 13 | Comp. Ex. 14 |
|---|---|---|---|---|---|---|
| Accelerating voltage | 150 kV | 200 kV | 250 kV | Non-irradiated | 140 kV | 250 kV |
| Exposure dose | 5 Mrad | 20 Mrad | 40 Mrad | | 4 Mrad | 45 Mrad |

TABLE 14-continued

|  | Example 28 | Example 29 | Example 30 | Comp. Ex. 12 | Comp. Ex. 13 | Comp. Ex. 14 |
|---|---|---|---|---|---|---|
| Evaluation after vulcanization | Good | Good | Good | Impaired (Melted & broken) | Impaired (Foamed surface) | Good |
| Evaluation after indoor endurance test | Good | Good | Good | Unevaluated* | Good | Impaired** |
| Degree of air leakage (%/month) | 1.9 | 1.9 | 1.9 | 7.0 | 1.9 | 1.9 |
| Tire weight |  |  |  |  |  |  |
| (Kg) | 7.3 | 7.3 | 7.3 | 7.3 | 7.3 | 7.3 |
| (%) | (92.4) | (92.4) | (92.4) | (92.4) | (92.4) | (92.4) |

Note: *The inner liner surface was impaired (unevaluated). **The rubber layer and the layer (D) were peeled.

As apparent from Table 14, the laminated films of Examples 28 to 30 were irradiated with an electron beam in a dose of 5 to 40 Mrad at an accelerating voltage of 150 to 250 kV, and thereby made free of fracture. The obtained tires were provided with the inner liners having an increased adhesion to the carcass layer.

EXAMPLES 31 to 33

Three different laminated films were produced in the same manner as in Examples 28 to 30 except that the gas barrier layer (A) of the laminated films was composed of polyphenylene ether/polyamide alloy. The laminated films were irradiated with an electron beam in a dose of 5, 20 and 40 Mrad at an accelerating voltage of 150, 200 and 250 kV, respectively. Using the laminated films, tires were produced by the same procedure as in Example 19. Table 15 shows the visual evaluation of the tire after vulcanization, visual evaluation of the tire after indoor endurance test, results of air leakage test, and measurements of the tire weight.

COMPARATIVE EXAMPLES 15 and 16

Tires were produced in the same manner as in Examples 31 to 33 with the exception of difference in non-exposure or exposure to an electron beam in a dose of 100 Mrad at an accelerating voltage of 250 kV as shown in Table 15. Table 15 shows the visual evaluation of the tire after vulcanization, visual evaluation of the tire after indoor endurance test, results of air leakage test, and measurements of the tire weight.

TABLE 15

|  | Example 31 | Example 32 | Example 33 | Comp. Ex. 15 | Comp. Ex. 16 |
|---|---|---|---|---|---|
| Accelerating voltage/ Exposure dose | 150 kV 5 Mrad | 200 kV 20 Mrad | 250 kV 40 Mrad | Non-irradiated | 250 kV 100 Mrad |
| Evaluation after vulcanization | Good | Good | Good | Impaired* | Good |
| Evaluation after indoor endurance test | Good | Good | Good | Unevaluated** | Impaired*** |
| Degree of air leakage (%/month) | 2.1 | 2.1 | 2.1 | 7.0 | 1.9 |
| Tire weight |  |  |  |  |  |
| (Kg) | 7.3 | 7.3 | 7.3 | 7.3 | 7.3 |
| (%) | (92.4) | (92.4) | (92.4) | (92.4) | (92.4) |

Note:
*The inner liner was melted and fractured.
**The inner liner surface was impaired (unevaluated).
***The rubber layer and the layer (D) were peeled.

As apparent from Table 15, the inner liners formed of polyamide-based alloy according to the invention were kept from fracture due to the exposure to an electron beam in a dose of 40 Mrad or less. The inner liners were imparted an increased adhesion to the carcass layer.

EXAMPLES 34 and 35

5-layer laminated films for a tire with a size of 185/65 R14 were formed by laminating, in the structure of FIG. 2, rubber-adhering layers (D) of ethylene-ethyl acrylate copolymer (EEA) (100 parts by weight used) containing 3 parts by weight of triallyl isocyanurate (TAIC), adhesive layers (B) of ethylene-ethyl acrylate-maleic anhydride terpolymer (100 parts by weight used) containing 3 parts by weight of TAIC and a gas barrier layer (A) of nylon 66. The lamination was conducted as follows. A T-die was connected to 5 extruders independently operable. Among the five extruders, the resin for the rubber-adhering layers (D) was supplied to two extruders, the resin for the adhesive layers (B) to two extruders, and the resin for the gas barrier layer (A) to the other extruder. After co-extrusion, the molten laminated 5 layers were quenched with a roll cooled with water, giving laminated films composed of 5 flat layers with a structure of (D)/(B)/(A)/(B)/(D). The thickness of the laminated films was 100 μm ((D)/(B)/(A)/(B)/(D)=30/2/36/2/30 μm). Subsequently the laminated films were irradiated at both sides with an electron beam in the dose and at the accelerating voltage shown in Table 16. Tires were produced in the same manner as in Example 19. Table 16 below shows the visual evaluation of the obtained tire, visual evaluation of the tire after indoor endurance test, results of air leakage test, and measurements of the tire weight.

TABLE 16

| Inner liner | Example 34 | Example 35 |
|---|---|---|
| Layer (D) (thickness = 30 μm) | EEA/TAIC | EEA/TAIC |
| Layer (B) (Thickness = 30 μm) | Ethylene-ethyl acrylate-maleic anhydride terpolymer/ TAIC | Ethylene-ethyl acrylate-maleic anhydride terpolymer/ TAIC |
| Layer (A) (Thickness = 30 μm) | Nylon 66 | Nylon 66 |
| Accelerating voltage/Exposure dose | 150 kV 0.5 Mrad | 150 kV 3.0 Mrad |
| Evaluation after vulcanization | Good | Good |
| Evaluation after indoor endurance test | Good | Good |
| Degree of air leakage (%/month) | 1.9 | 1.9 |
| Tire weight | | |
| (Kg) | 7.3 | 7.3 |
| (%) | (92.4) | (92.4) |

As apparent from Table 16, because of TAIC incorporated in the rubber-adhering layers (D) and the adhesive layers (B), the inner liners of the invention were kept from fracture although exposed to only a small dose (0.5 Mrad) of an electron beam, and were imparted a high adhesion to the carcass layer.

What we claim is:

1. A laminate gas barrier for pneumatic tires comprising a laminated film and a rubber layer (R), the laminated flm comprising a gas barrier layer (A) and an adhesive layer (B), the layer (B) being provided on at least one side of the layer (A), the layer (A) comprising at least one member selected from the group consisting of polyamide resins, polyester resins, polyarylate resins, polyamide alloys and polyester alloys, wherein the laminated film is crosslinked by electron beam irridation and the adhesive layer (B) is formed of at least one adhesive resin selected from (i) modified polymers prepared by copolymerizing or graft-copolymerizing a homopolymer or copolymer of olefins with unsaturated carboxylic acids, their anhydrides, esters or metal salts and (ii) ethylene-glycidyl methacrylate-methyl acrylate terpolymers, and is heat-bonded to the rubber layer (R), the laminated film having a thickness of 25 to 200 μm and wherein the gas barrier layer (A) has a thickness of 3 to 50 μm.

2. The laminate gas barrier according to claim 1, wherein the rubber layer (R) is formed of at least one member selected from the group consisting of natural rubbers, polyisoprene rubbers, styrene-butadiene copolymer rubbers, EPM, IIR, butyl bromide rubbers, chlorinated butyl rubbers and bromide of isobutylene-p-methyl styrene copolymer.

3. The laminate gas barrier according to claim 1, wherein the laminated film comprises a film irradiated in one surface with an electron beam at an accelerating voltage of at least 150 kV.

4. The laminate gas barrier according to claim 1, wherein the laminated film comprises a film irradiated with an electron beam in a dose of 5 to 40 Mrad.

5. A pneumatic tire wherein the laminated film in the laminate gas barrier of claim 1 is provided as an inner liner.

6. The laminate gas barrier according to claim 1 which is one produced by irradiation with an electron beam after laminating the gas barrier layer (A) and the adhesive layer (B).

7. A laminate gas barrier for pneumatic tires comprising a laminated film and a rubber layer (R), the laminated film comprising a rubber-adhering layer (D), an adhesive layer (B) and a gas barrier layer (A), the layers (D), (B) and (A) being laminated in this order with a structure of at least three layers, the rubber-adhering layer (D) comprising at least one polyolefin resin, the gas barrier-layer (A) comprising at least one member selected from the group consisting of polyamide resins, polyester resins, polyarylate resins, polyamide alloys and polyester alloys, wherein the laminated film is crosslinked by electron beam irradiation, and the adhesive layer (B) is formed of at least one adhesive resin selected from (i) modified polymers prepared by copolymerizing or graft-copolymerizing a homopolymer or copolymer of olefins with unsaturated carboxylic acids, their anhydrides, esters or metal salts and (ii) ethylene-glycidyl methacrylate-methyl acrylate terpolymers, and the rubber-adhering layer (D) is heat-bonded to the rubber layer (R), the laminated film having a thickness of 20 to 300 μm and wherein the gas barrier layer (A) has a thickness of 3 to 50 μm.

8. The laminate gas barrier according to claim 7, wherein the rubber layer (R) comprises at least one member selected from the group consisting of natural rubbers, polyisoprene rubbers, styrene-butadiene copolymer rubbers, EPM, IIR, butyl bromide rubbers, chlorinated butyl rubbers and bromide of isobutylene-p-methyl styrene copolymer.

9. The laminated gas barrier according to claim 7, wherein the laminated film comprises a film irradiated in one surface with an electron beam at an accelerating voltage of at least 150 kV.

10. The laminate gas barrier according to claim 7, wherein the laminated film comprises a film irradiated with an electron beam in a dose of 5 to 40 Mrad.

11. A pneumatic tire wherein the laminated film in the laminate gas barrier of claim 9, is provided as an inner liner.

12. The laminate gas barrier according to claim 7, which is one produced by irradiation with an electron beam after laminating the gas barrier layer (A), and adhesive layer (13) and the rubber-adhering layer (D).

* * * * *

UNITED STATES PATENT AND TRADEMARK OFFICE
CERTIFICATE OF CORRECTION

PATENT NO.: 5,992,486
DATED : November 30, 1999
INVENTOR(S): KATSUKI et al.

It is certified that an error appears in the above-identified patent and that said Letters Patent is hereby corrected as shown below:

On the title page of the patent in item [73], the assignees, change "Gunze Limited, Tokyo-to" to be --Gunze Limited, Kyoto-fu-- and "The Yokohama Rubber Co., Ltd., Kyoto-fu" to be --The Yokohama Rubber Co., Ltd., Tokyo-to--.

Signed and Sealed this

Eighth Day of August, 2000

Attest:

Q. TODD DICKINSON

Attesting Officer

Director of Patents and Trademarks